Dec. 4, 1956 C. J. FINK ET AL Re. 24,246
MULTIPLE SHINGLE STRUCTURE
Original Filed Nov. 19, 1952 2 Sheets-Sheet 1
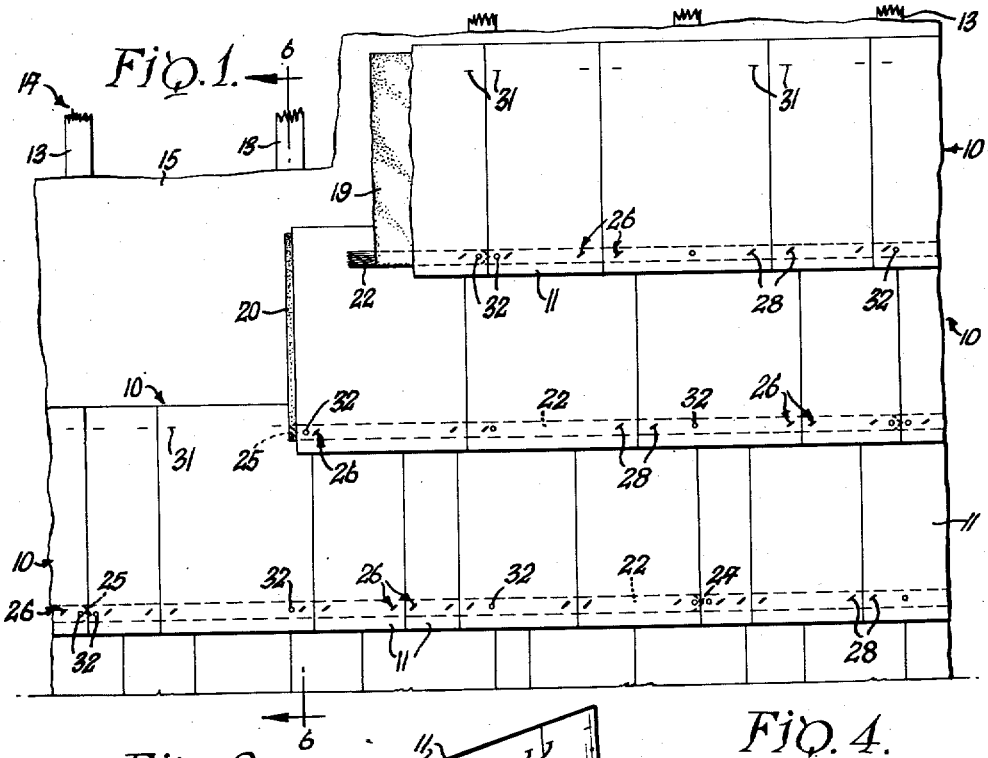
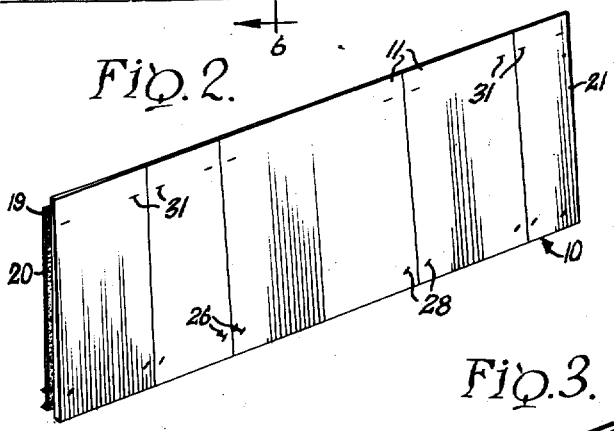
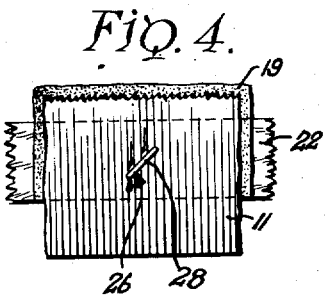
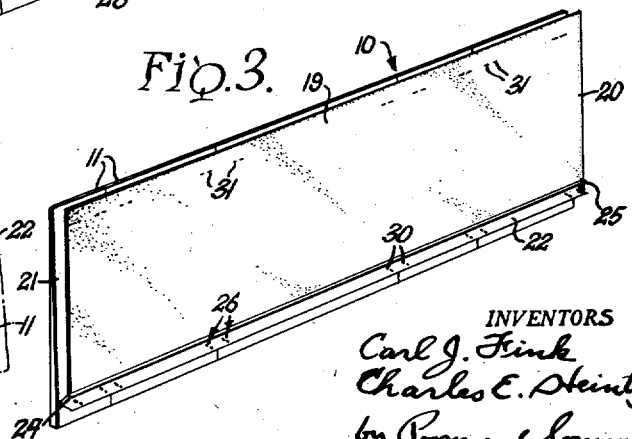
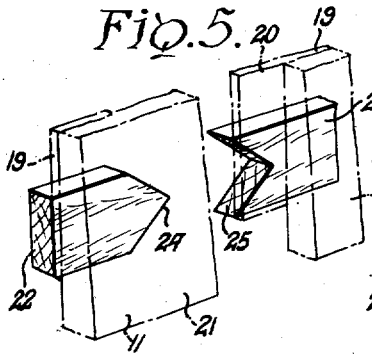
INVENTORS
Carl J. Fink
Charles E. Steintz
by Poppa and Sommer
ATTORNEYS

MULTIPLE SHINGLE STRUCTURE

Original Filed Nov. 19, 1952 2 Sheets-Sheet 2

INVENTOR.
Carl J. Fink
Charles E. Steintz
by Popp and Sommer
ATTORNEYS.

United States Patent Office

Re. 24,246
Reissued Dec. 4, 1956

24,246

MULTIPLE SHINGLE STRUCTURE

Carl J. Fink, Clarence, and Charles E. Heintz, Elma, N. Y., assignors to Creo-Dipt Company, Inc., North Tonawanda, N. Y., a corporation of New York Original No. 2,672,831, dated March 23, 1954, Serial No. 321,424, November 19, 1952. Application for reissue March 9, 1956, Serial No. 570,660

16 Claims. (Cl. 108—8)

Matter enclosed in heavy brackets [ ] appears in the original patent but forms no part of this reissue specification; matter printed in italics indicates the additions made by reissue.

This invention relates to a multiple shingle structure and more particularly to a panel unit having a horizontal length spanning two or more studs or rafters and including a row of individual tapered wooden shingles.

While the need of such a multiple shingle structure or panel unit having a surface composed of separate or individual shingles, particularly standard tapered wooden shingles, is obvious, up to the present time there has been no satisfactory solution to the problem of providing such a unit which can be applied under all conditions encountered in shingling and in which each individual shingle is reliably secured by a plurality of metal fasteners to the framework of the building.

With buildings having wooden sheathing, multiple wooden shingle units have been satisfactorily applied by nailing each shingle of the panel unit to the sheathing. However, this being a field operation the soundness of the shingling was dependent on the care of the carpenter and even then, with a most conscientious carpenter, if the units were prime coated, a shingle could remain unnailed because of the paint concealing its line of division with an adjacent shingle.

With the advent of gypsum panels as sheathing, such nailing of each shingle to the sheathing was impossible because such panels, composed of paper covered gypsum, would not serve as an anchorage for shingle nails driven therein. Accordingly such shingle units were unsatisfactory for gypsum panel sheathed structures.

Other solutions have been proposed but have disadvantages in point of cost, weight, dependence on adhesives, too critical fits or dependence on care in application.

The principal object of the present invention is to provide such a multiple shingle unit or structure having individual shingles, which insures a tightly shingled side wall or roof with each individual shingle reliably secured by metal fasteners to the framework.

Another object is to insure such a tightly shingled side wall or roof regardless of the care exercised by the carpenters at the site. While conceivably the nailing of a whole unit of the present invention could be overlooked, such omission would at once make itself known and require little effort to remedy.

Another most important object is to provide such a unit which can be applied on any structure having wooden studs or rafters, regardless of whether such studs or rafters carry wooden sheathing or substitute sheathing such as plywood or gypsum sheathing, old siding of any type or, for that matter, regardless of whether the studs or rafters carry any sheathing or siding at all.

Another aim is to provide such a multiple shingle unit which can be applied with a minimum of effort, it being merely necessary to drive one nail through each unit into each stud. This results in rapid shingling of large areas.

Another purpose is to provide such a multiple wooden shingle unit in which a broken shingle can be readily removed, replaced and the replaced shingle firmly secured and which replacement can be as the structure is being shingled or after the shingled structure has been in service for years.

Another aim is to provide such multiple shingle units which are self-alining so that the attention and effort of the carpenters can be devoted to nailing the units rather than to checking their alinement.

Another object is to provide such a multiple shingle unit which includes a so-called vapor barrier, that is, a sheet of moisture repellant felt or paper and which sheets are substantially coextensive with the surface of the shingles so that the entire shingled structure is provided with such vapor barrier.

Another important object is to provide such multiple shingle units which are light in weight and easy to handle.

Another object is to provide such a multiple shingle unit which is tight against wind passage.

Another purpose is to provide such a multiple shingle unit which can be produced in any type or style of shingling and in particular in which the butts of the several shingles are spaced from the faces of the next lower course to provide pronounced shadow lines in the shingling.

Another important object is to provide such a multiple shingle unit which conforms to present building codes.

Another most important object is to provide such a multiple shingle unit which is low in cost even when made with materials of lasting quality, such as stainless steel nails and staples.

Another important object is to provide such a unit which is adapted for sale with a prime coating with the builder selecting the color of the final coat.

Another object is to provide such a multiple shingle unit in which there is no intereference with the application of such final coat of paint and in which such final coat of paint augments the tightness and long lasting qualities of the shingling.

Another aim is to provide such a multiple shingle unit which is readily adaptable to special conditions of fit often encountered in shingling.

Other objects and advantages of the invention will be apparent from the following description and drawings in which:

Fig. 1 is a fragmentary side elevational view of the wall of a frame building having its studs shingled with multiple shingle units or structures embodying the present invention.

Fig. 2 is a perspective view of one of the multiple shingle units or structures shown in Fig. 1 and viewed from the front or exposure side thereof.

Fig. 3 is a view similar to Fig. 2 but viewed from the reverse or rear side thereof.

Fig. 4 is an enlarged fragmentary side elevational view of the exposure face of the multiple shingle unit and showing the manner in which exposed staples are preferably applied so as not to retain paint applied to the shingled surface.

Fig. 5 is an enlarged fragmentary, perspective, phantom view of the abutting ends of two multiple shingle units embodying the present invention and showing the manner in which they aline themselves as they are erected.

Figure 6:
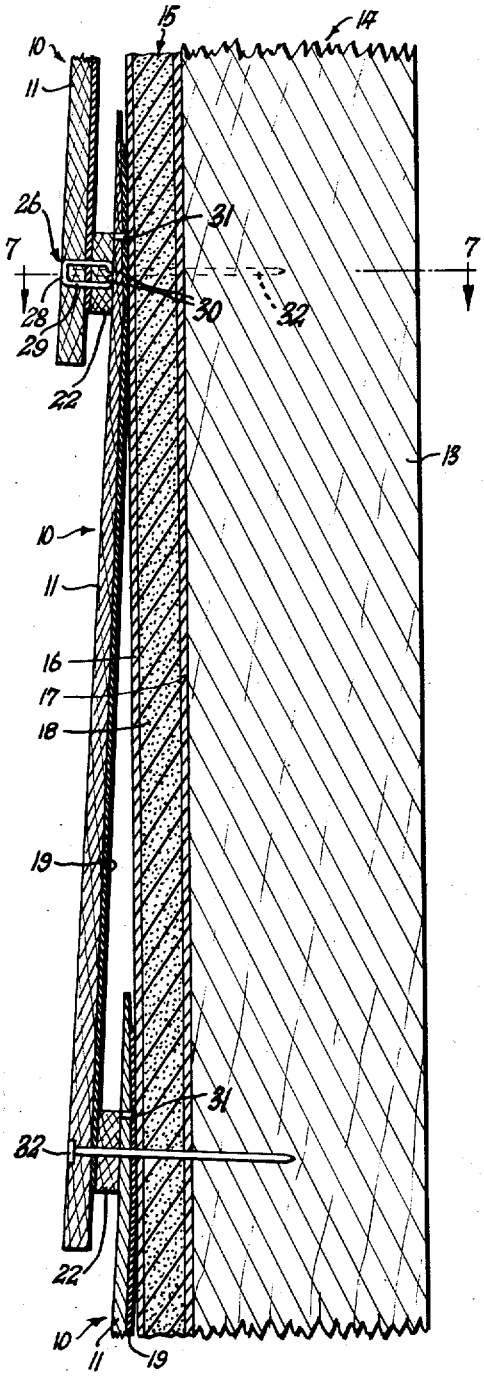
Fig. 6 is an enlarged vertical section through the wall shown in Fig. 1 and taken generally on line 6—6, Fig. 1.
Figure 7:
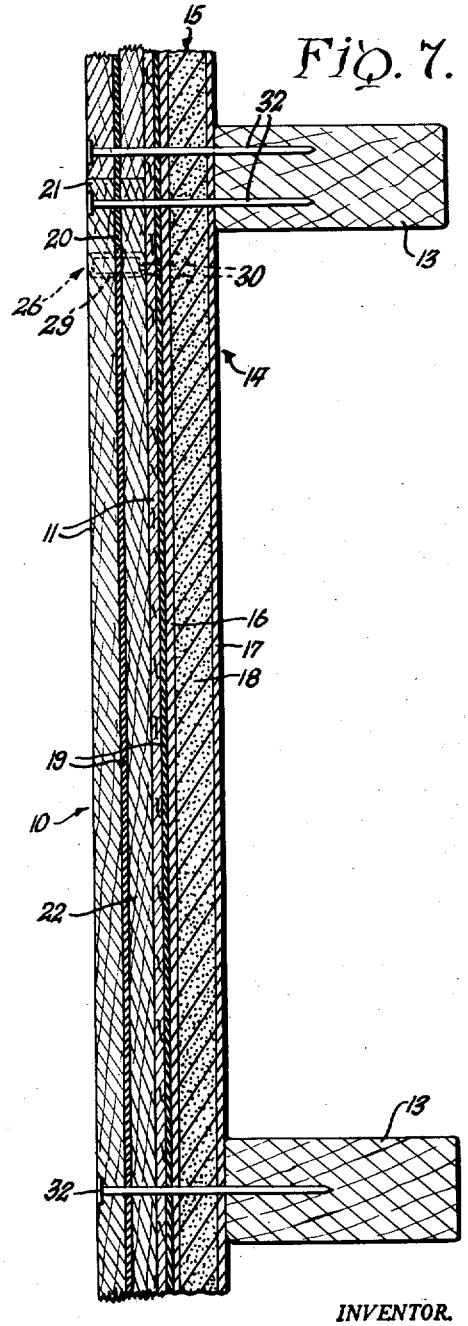
Fig. 7 is a fragmentary horizontal sectional view taken generally on line 7—7, Fig. 6.

Each shingle unit or structure of the present invention includes a row 10 of shingles 11 with the length of the row preferably being equal to the spacing of the studs 13 of the supporting structure shown as a wall 14, the length of the row of shingles being equal to the spacing of, say, three studs or 4 feet. Before the shingle units are applied to the wall structure 14, the studs 13 would normally be sheathed with a sheathing 15. Such sheathing 15 is commonly in the form of paper faced panels of gypsum, the paper facings being indicated at 16, 17 and the gypsum core at 18. The multiple shingle units of the present invention can be applied to any type of sheathing or siding, new or old, and can also be applied directly to the bare studs 13. However, in view of the common use of gypsum panel sheathing and in view of the special problems involved in shingling a structure so sheathed with gypsum sheathing, such gypsum sheathing has been illustrated.

The row 10 of shingles 11 of each multiple shingle structure of the present invention is backed by a strip 19 of sheet material which in addition to contributing to holding the shingles 11 together as a unit also forms a vapor barrier under the shingled surface. For this dual purpose the backing sheet 19 is preferably in the form of a separate preformed fiber strip of paper or felt of substantial thickness, say, in the order of ⅛ of an inch and extends along and contacts or covers substantially the entire rear face of each shingle 11 as well as of the row of shingles, although preferably terminating at its upper and lower edges short of the tip and butt ends of the row 10 of shingles. It is important to render this strip moisture repellant which can be done by incorporating tar or any other suitable material therein. This backing sheet 19 is preferably equal in length of the length of the row 10 of shingles of each unit but is preferably offset lengthwise of the row so that one end, indicated at 20, projects beyond the row 10 of shingles while at the other end of the unit the row of shingles projects beyond the backing sheet 19, as indicated at 21.

In combination with the moisture repellant paper or felt backing sheet 19, the principal feature of the invention resides in a narrow strip 22, preferably of wood, along the rear face of the backing sheet 19 parallel with and adjacent to but spaced from the butt ends of the shingles 11 of the row 10. This strip is preferably in the form of a narrow strip being, say, nominally 1¼ inches wide and ⅜ inch thick. This strip is preferably made of wood so that nails and staples can not only be driven through the strip but also so shingle nails can be driven into the strip to become anchored therein in replacing a broken shingle. While wood is, of course, preferred other materials capable of so receiving and preferably anchoring nails and having the requisite strength and rigidity could be used.

For the purpose of rendering the multiple shingle units of the present invention self-alining when applied to the supporting structure 14, one end of each of the wooden strips 22 is provided with a V-shaped projection or point 24 while its opposite end is provided with a complementary V-shaped notch 25. The distance from the extremity of the projection 24 to the bottom of the V-shaped notch 25 at the opposite end of each wooden strip 22 is approximately equal to the length of the row 10 of shingles and accordingly the overall length of each strip 22 is of a length greater than the row 10 of shingles to the extent of the depth of the V-shaped notch 25 as measured lengthwise of the wooden strip 22.

As shown in the drawings the degree of offset of the row 10 of shingles with reference to the backing sheet 19 is equal to the excess in the overall length of the wooden strip 22 over either the row 10 of shingles or its backing sheet and the pointed end 24 of this wooden strip 22 is arranged in register with the projecting end 21 of the row of shingles while the opposite notched end 25 of the wooden strip 22 is arranged in register with the projection 20 of the backing sheet 19, as best shown in Figs. 2, 3 and 5.

The butt end of each shingle 11 is secured both to the backing sheet 19 and the wooden strip 22 by two or more staples 26 which, as shown in Figs. 4 and 6 preferably have a cross part 28 arranged against the exposure face of each shingle 11 near each butt end corner thereof and with its legs 29 driven completely through the shingle 11, the backing sheet 19 and the wooden strip 22 with the ends of these legs clinched over, as indicated at 30 against the rear face of the wooden strip 22. These staples are preferably made of a substantially non-rusting metal such as hot zinc dipped steel, stainless steel, Monel metal, aluminum or the like, and their cross parts 28 are preferably disposed at an oblique angle with reference to the row 10 of shingles so that these cross parts do not have any tendency to retain paint if the shingles are painted after being applied to the structure 14.

The tip end of each shingle 11 is secured to the backing sheet 19 by at least one staple 31. These staples are concealed when shingling is completed and hence they can be driven through from either the front or the rear side of the shingle structure or unit and preferably have their legs clinched in the same manner as with the staples 26. These staples 31 are also preferably made of a substantially non-rusting metal.

In applying the multiple shingle units of the present invention it will be assumed that the structure 14 to be shingled is in the form of the wall having studs 13 on standard 16 inch centers and that these studs are sheathed with paper covered panels 15 of gypsum, such gypsum sheathing being characterized by their inability to anchor shingle or other types of nails.

In starting the bottom course of shingles, one of the multiple shingle units is placed in position to span the assumed four studs 13. This unit is then nailed to each stud 13 against which the unit has been placed by, say, a seven or eight penny finishing nail 32. Accordingly each multiple shingle structure is secured to each of the assumed four studs 13 and is therefore secured by four nails 32. Each of these nails 32 is preferably made of a substantially non-rusting metal and an important feature is that each nail 32 passes through the butt end of the shingle 11 along a line marked by the exposed or cross parts 28 of the line of staples 26; the tarred felt or paper backing panel 19; the wooden strip 22; the assumed gypsum panel sheathing 15; and anchors in the corresponding stud 13.

After the first unit has been nailed in position the next multiple shingle unit is placed with the projection or notch 24 or 25 in mating relation with the notch or projection 25, 24 of the nailed unit and is placed against the sheathing 15. This automatically alines the shingle unit being positioned horizontally with the shingle unit previously nailed and hence facilitates horizontal alinement of the first course of shingles on the structure 14 although care must also be taken, of course, to see that the initial row of shingles is properly horizontally alined.

After the first course of shingle units have been so nailed to the studs 13 the second course of shingle units is applied. In starting this second course of shingle units the first multiple shingle unit to be applied is preferably arranged in breakjoint relation with the multiple shingle unit over which it is placed, the purpose of this being to avoid a vertical line of shingle joints along particular studs 13. The first multiple shingle unit of the second course of shingles is arranged so that its wooden strip 22 is disposed against the front face of the first course of shingles adjacent to but spaced from the tip ends of this first course of shingles. While the degree of overlap of the courses is optional, for a particular shingle size this overlap is usually fixed and the row of staples 31 are preferably spaced from the tips of the shingles 11 such distance to serve as a gage in applying the next succeeding higher course of shingles. Thus, as shown in Fig. 1, the row of staples 31 can be arranged to register with the upper edge of the wooden strip 22 of the next higher course of shingle units and thereby insure that this next higher course of shingle units is arranged parallel with the first course.

The first unit of the second course of shingles is then nailed to the studs 13 in the same manner as with the first course of shingles. It will be noted, however, that each nail 32 of this second course of shingle units passes through the butt end of a corresponding shingle 11 of this second course along a line marked by the exposed parts 28 of the row of staples 26; its tarred felt backing sheet 19; its wooden strip 22; the tapered end of a corresponding shingle 11 of the next lower or first course; the tarred felt backing sheet 19 of this next lower or first course; the assumed gypsum panel sheathing 15; and anchors in the corresponding stud 13.

The second unit of the second course is applied in the same manner as the second unit of the first course, the pointed or notched end 24, 25 of the wooden strip 22 of the unit being applied being fitted in the notched or pointed end 25, 24 of the first or nailed unit of the second course and this second unit being secured by the nails 32 in the same manner as with this first unit. The units are so applied, course upon course, until the shingling of the structure 14 is completed.

If any special fitting conditions are encountered it will be seen that the multiple shingle structure can be sawed to suit any particular condition so encountered. It will also be seen that if in any such fitting, or in the nailing, any shingle 11 should be broken it can readily be removed and replaced with another shingle. Thus the broken shingle can be split so as to free it from its staples 26, 31; these staples can be removed or hammered down; a new shingle can be cut to the width of the removed shingle; and this new shingle can be fitted in the position of the removed shingle and secured by shingle nails (not shown) to the wooden strip 22. This replacement of broken shingles can be done after the shingling has been in service for many years and facilitates keeping the shingling in tight and serviceable condition.

It will particularly be noted that each shingle 11 is securely fastened to its wooden strip 22 by two or more staples 26 as a factory operation thereby to insure the reliable securement of each individual shingle. Since each wooden strip 22 is also secured to each stud 13 by a large nail 32, it will be seen that each shingle 10 is reliably secured to the studding. It will also be particularly noted that this securement of each shingle 11 to the studs 13 is wholly independent of the type of sheathing 15 which also obviously could be old siding or, for that matter, could be non-existent with the multiple shingle structures of the present invention secured to the studs 13 without any sheathing.

It will further be noted that the wooden strips 22 act as barriers against wind or rain being driven up under the shingles and that the interfitted pointed and notched ends 24, 25 of these wooden strips 22 further inhibit rain being driven up past the ends of these wooden strips. It will be also observed that these wooden strips 22 serve to space the butt ends of the shingles 10 from the exposed faces of the next lower course of shingles so as to provide a pronounced shadow line in the shingling between the several courses thereof thereby to greatly enhance the beauty of the shingling.

Also to be noted is the fact that while the shingles are shown in regular arrangement they can be buit into the multiple shingle structures in any pattern, such as to provide a random length effect. It will further be seen that at adjacent ends of the units the end shingle of one unit overlaps the extension 20 of the tarred felt backing sheet of the other unit so as to provide sealed joints between the ends of the units. It will also be seen that these tarred felt backing sheets 19, in addition to holding the several shingles of each unit in properly assembled position, also act as a vapor barrier which completely covers the structure being shingled and inhibits the passage of moisture through the wall or roof so shingled.

Preferably the shingles 11 and the wooden strips 22 are prime coated and when the shingling as above described is complete a final coat of paint of any desired color is applied over the exposed faces of the shingles. Such final coat covers the cross parts 28 of the exposed staples 26 as well as the heads of the nails 32. By the slanted arrangement of the cross parts 28 of the staples 26, there is no tendency for paint to collect thereon and run down in streaks after the painter has passed. Also this angular disposition of these staples 26 tends to reduce splitting of the wooden strips 22 since they are placed out of alinement with the grain of the wood.

Most building codes approve the application of wooden shingles to strips of lath extending between the studs and hence it will be seen that the present invention is not at variance with present building codes.

From the foregoing it will be seen that the present invention provides a very low cost multiple shingle unit which can be applied to a frame structure having any kind of sheathing or siding or which is unprovided with sheathing and in which each shingle is firmly and reliably secured to the studding and in which the shingling can be effected rapidly and by carpenters having little experience in shingling. It will further be seen that the multiple shingle structure of the present invention accomplishes the various objects and has the numerous advantages as set forth.

We claim:

1. As an article of manufacture, a multiple shingle structure comprising a row of separate nailable shingles arranged in edge-to-edge relation, a separate preformed *felted* fiber *water repellant* backing sheet extending *in face-to-face relation* along the greater part of the rear of said row and of each individual shingle, a narrow nailable *wooden* strip *capable of receiving and also anchoring nails* extending along the rear of said row along *substantially the full length* and adjacent one longitudinal edge of said row and remote from the opposite longitudinal edge thereof, [and] means securing each shingle adjacent said one longitudinal edge of said row to said *wooden* strip, and means securing at least some of said shingles intermediate said *wooden* strip and said opposite longitudinal edge to said *felted fiber* backing sheet.

2. As an article of manufacture, a multiple shingle structure comprising a row of separate nailable shingles arranged in edge-to-edge relation, a separate preformed fiber backing sheet extending along the greater part of the rear of said row and of each individual shingle, a narrow nailable strip *capable of receiving and also anchoring nails* extending along the rear of said *preformed fiber backing sheet along substantially the full length* row along and adjacent one longitudinal edge of said row and remote from the opposite longitudinal edge thereof, means securing each shingle adjacent said one longitudinal edge of said row to said nailable strip, and means securing at least some of said shingles adjacent said opposite longitudinal edge of said row to said *preformed fiber* backing sheet, said *preformed fiber* backing sheet being interposed between said nailable strip and said row of shingles.

3. As an article of manufacture, a multiple shingle structure comprising a row of separate nailable shingles arranged in edge-to-edge relation, a separate preformed fiber backing sheet extending along the greater part of the rear of said row and of each individual shingle, a narrow nailable strip *capable of receiving and also anchoring nails* extending along the rear of said *preformed fiber* backing sheet along *substantially the full length* and adjacent to one longitudinal edge of said row and remote from the opposite longitudinal edge thereof, said preformed fiber backing sheet being interposed between said nailable strip and said row of shingles, a row of metal fasteners extending along said one longitudinal edge of said row with each fastener extending into said nailable strip, preformed fiber backing sheet and a corresponding shingle, and means securing each shingle adjacent said opposite longitudinal edge of said row to said preformed fiber backing sheet.

4. As an article of manufacture, a multiple shingle structure comprising a row of tapered wooden shingles arranged in edge-to-edge relation with their butts and tips forming respectively opposite longitudinal edges of said row, a narrow nailable *wooden* strip *capable of receiving and also anchoring nails* extending along the rear of said row along *substantially the full length* and adjacent the butt edge of said row and remote from the tip edge thereof, a separate preformed *felted fiber sheet* [strip] of water repellant [fibrous sheet] material extending *in face-to-face relation* along substantially the entire rear area of said row along and adjacent both said tip and butt edges of said row *and spaced from said butt edges of said row,* means securing each shingle to said nailable *wooden* strip, and means arranged adjacent said tip edge of said row and securing at least some of said shingles to said *felted fiber sheet* [strip] of water repellant [sheet] material.

[5. As an article of manufacture, a multiple shingle structure comprising a row of tapered wooden shingles arranged in edge-to-edge relation with their butts and tips respectively forming opposite longitudinal edges of said row, a backing sheet of water repellant material extending along the greater part of the rear of said row and of each individual shingle and projecting beyond one end of said row to underlay the end of an adjacent multiple shingle structure, a narrow nailable strip extending along the rear of said row along and adjacent one longitudinal edge of said row and the adjacent longitudinal edge of said backing sheet and remote from the opposite longitudinal edge of said row, means securing each shingle to said nailable strip, and means arranged along said opposite longitudinal edge of said row and securing at least some of said shingles to said backing sheet.]

6. As an article of manufacture, a multiple shingle structure comprising a row of tapered wooden shingles arranged in edge-to-edge relation with their butts and tips respectively forming opposite longitudinal edges of said row, a backing sheet of water repellant material arranged in face-to-face relation with the greater part of the rear of said row and of each individual shingle and projecting beyond one end of said row to underlay the end of an adjacent multiple shingle structure, a narrow wooden strip *capable of receiving and also anchoring nails* extending along the rear of said backing sheet and along *substantially the full length* and adjacent the butt edge of said row and remote from the tip edge of said row, a row of metal fasteners along said wooden strip with each fastener extending into said wooden strip, said backing sheet and the butt of a corresponding shingle, and a second row of metal fasteners along the top edge of said row and connecting said backing sheet with the tip end of each shingle.

7. As an article of manufacture, a multiple shingle structure comprising a row of separate nailable shingles arranged in edge-to-edge relation, a narrow nailable strip extending along the rear of said row along and adjacent one longitudinal edge of said row and remote from the opposite longitudinal edge thereof, the overall length of said strip being greater than the length of said row and being provided at its opposite ends with a complemental notch and projection each substantially equal, in a direction lengthwise of said strip, to the difference between the overall length of said strip and the length of said row, a strip of sheet material extending along the rear of said row along and adjacent said opposite longitudinal edge of said row, means securing each shingle to said nailable strip, and means arranged adjacent said opposite longitudinal edge of said row and securing each shingle to said strip of sheet material.

8. As an article of manufacture, a multiple shingle structure comprising a row of tapered wooden shingles arranged in edge-to-edge relation with their butts and tips respectively forming opposite longitudinal edges of said row, a backing sheet of water repellant material extending along the greater part of the rear area of said row and of each individual shingle and projecting beyond one end of said row to underlay the end of an adjacent multiple shingle structure, a narrow wooden strip extending along the rear of said backing sheet and along and adjacent the butt edge of said row and remote from the tip edge of said row, the overall length of said strip being greater than the length of said row and said strip being provided at its opposite ends with a complementary notch and projection each substantially equal, in a direction lengthwise of said strip, to the difference between the overall length of said strip and the length of said row, a row of metal fasteners along said strip and each extending into said wooden strip, backing sheet and a corresponding one of said shingles, and a row of metal fasteners along the tip edge of said row and connecting said backing sheet with the tip end of each shingle.

9. A shingled structure, comprising a plurality of substantially uniformly spaced and substantially parallel wooden structural members arranged generally in a common plane, a plurality of *felted fiber backing sheets* [strips] of water repellant sheet material arranged in generally horizontal rows with their rear faces opposing said wooden structural members, a row of separate nailable shingles arranged in edge-to-edge relation with their upper ends across the front of each of said *felted fiber backing sheets* [strips of sheet material], a narrow nailable wooden strip *capable of receiving and also anchoring nails* along the rear of *substantially the full length of* the corresponding row of shingles adjacent the lower edge thereof and remote from the upper edge thereof, means securing the lower end of each shingle to its nailable *wooden* strip, means securing the upper end of each shingle to its *felted fiber backing sheet* [strip of sheet material], and means securing said shingles to said wooden structural members, comprising a nail extending through a corresponding shingle, its nailable *wooden* strip and anchored in each of said wooden structural members.

10. A shingled structure, comprising a plurality of substantially uniformly spaced and substantially parallel wooden structural members arranged generally in a common plane, a plurality of sheets of water repellant material arranged in generally horizontal rows with their rear faces opposing said wooden structural members and with their upper and lower edges in overlapping relation, *overlapping* [a] horizontal *rows* [row] of tapered wooden shingles arranged in edge-to-edge relation with their butt and tip ends respectively forming the lower and upper edges of the *rows* [row] of shingles and respectively arranged adjacent the lower and upper edges of *the rows of* [a companion] backing *sheets* [sheet], a horizontal wooden strip *capable of receiving and also anchoring nails* associated with each of said backing sheets and interposed between the overlapping portions of two rows of said *shingles and* backing sheets *and each in contact with its backing sheet and the row of shingles therebehind,* metal fastenings extending into and uniting the butt end of each shingle, its backing sheet and its wooden strip, metal fastenings extending into and uniting the tip end of each shingle with its backing sheet, and means uniting said shingles to said wooden structural members, comprising a nail extending through the butt end of a corresponding shingle, its backing sheet, its wooden strip, the tip of a shingle of the next succeeding lower row, its backing sheet, and anchored in each of said wooden structural members.

*11. As an article of manufacture, a multiple shingle structure comprising a row of separate nailable shingles arranged in edge-to-edge relation, separate backing means extending along the greater part, both longitudinally and transversely, of the rear side of said row and of each individual shingle thereof, a narrow nailable strip capable of receiving and also anchoring nails extending along the rear of said backing means along substantially the full length and adjacent one longitudinal edge of said row*

*and remote from the opposite longitudinal edge thereof, said backing means being interposed between said nailable strip and said row of shingles, and means securing each shingle and said backing means adjacent said one longitudinal edge of said row to said nailable strip.*

*12. As an article of manufacture, a multiple shingle structure as set forth in claim 11 wherein said shingles are tapered wooden shingles with their butts forming said one longitudinal edge of said row and their tips forming said opposite longitudinal edge of said row, and wherein said nailable strip is made of wood.*

*13. As an article of manufacture, a multiple shingle structure as set forth in claim 12 wherein said backing means is in the form of a one-piece sheet of water repellant material.*

*14. As an article of manufacture, a multiple shingle structure as set forth in claim 11 wherein said securing means is a row of metal fasteners extending along said one longitudinal edge of said row with each fastener extending into said nailable strip, backing means, and a corresponding shingle.*

*15. As an article of manufacture, a multiple shingle structure as set forth in claim 14 wherein said shingles are tapered wooden shingles with their butts forming said one longitudinal edge of said row and their tips forming said opposite longitudinal edge of said row, and wherein said nailable strip is in the form of a wooden strip in which said metal fasteners are anchored.*

*16. A shingled structure, comprising a plurality of substantially uniformly spaced and substantially parallel wooden structural members arranged generally in a common plane, a plurality of generally flat backing members arranged in generally horizontal rows with their rear faces opposing said wooden structural members and with their upper and lower edges in overlapping relation, overlapping horizontal rows of tapered wooden shingles arranged in edge-to-edge relation with their butt and tip ends respectively forming the lower and upper edges of the rows of shingles and respectively arranged adjacent the lower and upper edges of the rows of said generally flat backing members, a horizontal wooden strip capable of receiving and also anchoring nails associated with said backing members and interposed between the overlapping portions of two rows of said shingles and backing members and each in contact with its backing member and the corresponding row of shingles therebehind, metal fastenings extending into and uniting the butt end of each shingles, its backing member and its wooden strip, and means uniting said shingles to said wooden structural members, comprising a nail extending through the butt end of a corresponding shingle, its backing member, its wooden strip, the tip of a shingle of the next succeeding lower row, its backing member, and anchored in each of said wooden structural members.*

*17. As an article of manufacture, a multiple shingle structure comprising a row of tapered wooden shingles arranged in edge-to-edge relation with their butts and tips forming respectively opposite longitudinal edges of said row, a narrow nailable wooden strip capable of receiving and also anchoring nails extending along the rear of said row along substantially the full length and adjacent the butt edge of said row and remote from the tip edge thereof, a separate preformed felted fiber sheet of water repellant material extending in face-to-face relation along the greater part of the rear area of said row along and adjacent both said tip and butt edges of said row and spaced from said butt edges of said row, means securing each shingle to said nailable wooden strip, and means arranged adjacent said tip edge of said row and securing at least some of said shingles to said felted fiber sheet of water repellant material.*

References Cited in the file of this patent or the original patent

UNITED STATES PATENTS

| | | |
|---|---|---|
| 396,292 | Richmond | Jan. 15, 1889 |
| 1,814,291 | Caton | July 14, 1931 |
| 2,232,786 | Kendall | Feb. 25, 1941 |
| 2,276,170 | Elmendorf | Mar. 10, 1942 |
| 2,285,480 | Wilde | June 9, 1942 |